United States Patent [19]

Scheck et al.

[11] Patent Number: 4,976,543
[45] Date of Patent: Dec. 11, 1990

[54] METHOD AND APPARATUS FOR OPTICAL DISTANCE MEASUREMENT

[75] Inventors: Werner Scheck; Siegfried Idler, both of Kempten, Fed. Rep. of Germany; Bernard Furrer, Winterthur, Switzerland

[73] Assignee: Baumer Electric AG, Frauenfeld, Switzerland

[21] Appl. No.: 286,049

[22] Filed: Dec. 19, 1988

[30] Foreign Application Priority Data

Dec. 19, 1987 [DE] Fed. Rep. of Germany ....... 3743194
Nov. 18, 1988 [CH] Switzerland ........................ 4278/88

[51] Int. Cl.⁵ .............................................. G01C 3/02
[52] U.S. Cl. ................................................... 356/375
[58] Field of Search ....................... 356/371, 375, 376; 250/201 A F, 201.4; 350/399

[56] References Cited

U.S. PATENT DOCUMENTS

| | | | |
|---|---|---|---|
| 3,567,309 | 3/1971 | Jasgur | 350/399 |
| 3,719,421 | 3/1973 | Poilleux et al. | 356/4 |
| 4,017,188 | 4/1977 | Sawatari | 356/371 |
| 4,433,235 | 2/1984 | Akiyama et al. | 250/201 A F |
| 4,762,419 | 8/1988 | Caussignac et al. | 356/376 |

FOREIGN PATENT DOCUMENTS

| | | | |
|---|---|---|---|
| 0234997 | 9/1987 | European Pat. Off. | 356/376 |
| 2703463 | 8/1978 | Fed. Rep. of Germany . | |
| 3743194 | 12/1987 | Fed. Rep. of Germany . | |

*Primary Examiner*—Richard A. Rosenberger
*Attorney, Agent, or Firm*—Walter C. Farley

[57] ABSTRACT

A bundled light beam projected by a light source (21), particularly a laser light source, onto the target is partly reflected back into the measuring apparatus (20), focussed by a concave mirror (61, 81) and split by a beam splitter (26) into two partial beams (25, 25'), where the light detectors (28, 28'), which in one dimension are at least as long as the partial beams, are arranged at different distances from the beam splitter (26). A linear dependence between the quotient signal and the distance (15) from the measuring apparatus (2) to the target (11) results from the quotient of the detector signals.

31 Claims, 6 Drawing Sheets

METHOD AND APPARATUS FOR OPTICAL DISTANCE MEASUREMENT

The invention is in the field of geometrical optics, electronics and signal processing. It relates to a method and an apparatus for measuring the distance between an illuminated point on a light reflecting object and the measuring apparatus. The invention is based on the measurement of the intensity distribution of the focussed, diffuse reflected light beam at two different distances from the illuminated object, a light detector being located in the focal line of the optics. The light detectors are arranged in the common optical axis, but with different spacings. This is made possible by splitting up the scattered beam into two partial beams by means of a beam splitter.

BACKGROUND OF THE INVENTION

Optical methods for measuring distances are known. Thus, distance measurements are carried out electrically, by measuring the transit time of a light pulse reflected from a target. Equipment operating on this principle is mainly used in land surveying. For measuring short distances in the centimeter (cm) and decimeter (dm) range such a method is complicated because the short transit times, in the nanosecond range, require rapid electrooptical and electrical switching elements.

The triangulation method is more suitable for measurements in the dm range. It is based on producing a light spot on the target by a sharp light beam emanating from the measuring apparatus. This light spot is imaged on at least one light detector, which is inclined (laterally offset) with respect to the primary beam. The distance between the measuring apparatus and the object can be determined trigonometrically from the angle between the primary beam and the light spot-image spot connecting beam.

In order to ensure accurate angular determination in triangulation methods, the light spot on the object or target surface must be sharply imaged by means of a lens on the light detector, e.g. a diode array. In the case of a fixed lens setting, this permits high measuring accuracy only in a narrow distance range, unless the optics are constantly readjusted in an iteration process, which involves considerable extra effort and cost.

A further optical distance measuring principle is based on the measurement of the diffuse light scattering of a light spot produced on the object by means of a finely focussed light beam. Assuming that purely diffuse scattered light emanates from this light spot, the radiation at right angles to the object surface is approximately homogenous (Lambertian radiation). Two light detectors are arranged with different spacings along said beam, which is optionally focussed by means of a collimating lens. Thus, it is possible to determine from the measured illuminations the divergence or convergence angle of the beam. This also gives the sought object distance on the basis of the "inverse square law", i.e., the fact that the radiation intensity of a point source is inversely proportional to the square of the distance.

Methods of the above type are known, as is apparent from the patent specifications referred to hereinafter:

In U.S. Pat. No. 3,719,421, J. L. Poilleux and J. Tourret describe a method in which a light spot is produced on the object by means of optics and is subsequently imaged. Two diaphragms with detectors arranged beyond or in front of the image point permit a distance determination within a limited range by subtraction of the detector signals This method is suitable for accurate distance determination within narrow limits, but not in general terms for distance measurement. Outside of the aforementioned design range it is even ambiguous to associate the detector signal with the object-measuring apparatus spacing. Reference will be made concerning the detailed construction of the apparatus hereinafter in connection with FIG. 2.

A necessary criterion for the reliability of this method is the existence of diffuse back-reflection, but if reflection occurs in addition to diffuse scattering, measuring errors occur. The above U.S. patent describes measures which increase the corresponding measuring accuracy.

A further method, in which the distance measurement is based on the "inverse square law" is described in West German Patent No. 2 703 463 by E. H. Mehnert. In the latter the distance from a point light source is determined by measuring the illuminations of two surfaces located at different distances from the light source.

Three different apparatuses are given for carrying out the method. A first apparatus is based on the measurement of a large-area illuminated surface using two light detectors arranged behind teleoptics and which are located at different distances from the object. Although the teleoptics permit the sharp imaging of only a small area of the object on the detector surface, when the object is displaced the object spot is only unsharply imaged on the detector, but the illumination of the image is not changed, unless the object is very small, i.e., a small light spot. Thus, the apparatus according to claims 2 and 3 of the aforementioned patent cannot function.

In a second apparatus use is made of an infrared the object. The, radiation of this light source is measured by at least one light receiver. When the emitted intensity of the light transmitter is kept constant, it is possible to directly determine the distance from the apparatus to the infrared diode on the basis of the "inverse square law". If there are two light receivers, which can e.g., be realized by means of semi-reflecting mirrors, then the distance determination is not dependent on the radiation intensity of the light source.

The relationship between the measured illuminations of the light detectors and the distance is quadratic and not linear. By means of modern digital signal processing equipment, it is not difficult to resolve the "inverse square law". However, unlike the case of linear behavior between the measured quantity and the distance, the measuring error is not constant but, as a first derivation, is linearly dependent on the divergence from the desired value.

In addition, said second embodiment of the apparatus suffers from the disadvantage that the infrared diode must be located precisely in the optical axis of the light receiver. Otherwise, the light detector signal can no longer be unambiguously associated with the object distance.

Taking account of this latter fact, according to a third embodiment the light source, particularly a laser, is arranged directly in the optical axis of the measuring apparatus and, on the basis of FIG. 3, a detailed explanation will be given thereof hereinafter. However, it is pointed out here that also in the case of this third embodiment the link between the detector signals and the object distance is non-linear, which significantly influences evaluatability and measuring accuracy.

A third method based on the "inverse square law" forms the subject matter of German Patent application No. P 37 43 194.3 of Dec. 19, 1987. According to the latter, the spacing or distance information is also taken from the illumination of two light detectors at different distances from the object. The diffuse radiation emanating from the illuminated light spot is focused by means of optics. However, focussing does not take place two-dimensionally by means of an objective or lens, as described by J. L. Poilleux and J. Tourret in U.S. Pat. No. 3,719,421 but instead takes place only one-dimensionally by means of a cylindrical mirror. The light detectors, one of which is located in the focal line of the cylindrical optics, determine in one dimension the full light beam entering the apparatus. This structural embodiment differs significantly from West Germany Patent No. 27 03 463 of E. H. Mehnert, where there is no one-dimensional focusing and the position of the detectors is not specified. The new method gives a linear dependence of the distance to be measured on the quotient of the measured detector signals. The apparatus on which this method is based is explained in detail in connection with FIG. 6.

SUMMARY OF THE INVENTION

An object of the present invention is to so further develop the known method based on the "inverse square law" in such a way that an output signal is produced which is linearly dependent on the distance or range to be measured in order to provide a true distance measuring means or range finder. In addition, the measuring accuracy is of an optimum nature for a given measuring range.

This problem is solved in that the light bundle reflected by the object, following the incidence of a highly collimated parallel beam, is focused in the optical apparatus and that the measurement of the beam intensity of a partial beam takes place in the focal plane of the optics. The light detectors are in one dimension identical or larger than the beam diameter.

BRIEF DESCRIPTION OF THE DRAWINGS

The novel method and examples of corresponding apparatuses are described in greater detail hereinafter relative to the drawings, wherein.

DESCRIPTION OF THE PREFERRED EMBODIMENTS

Figure 1:
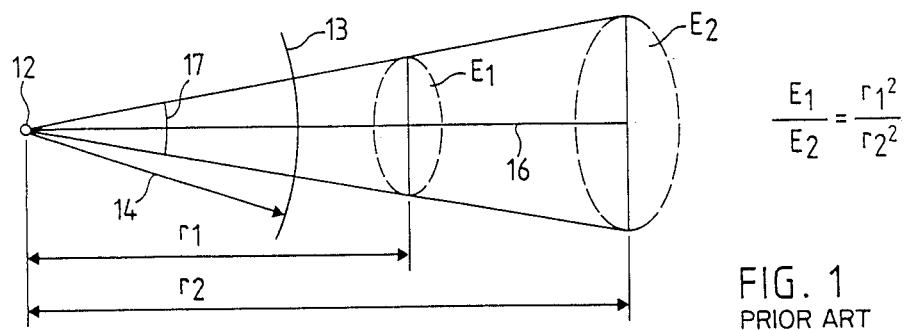
FIG. 1 is a representation of tee "inverse square law"

FIG. 1 illustrates the "inverse square law" which is based on the fact that the total light quantity passing through a spherical surface 13 and which emanates from a point light source 12 in the center of said sphere is independent of the sphere radius 14 when there is no absorption. For isotropic irradiation of the light source 12, this means that the illumination E of a spherical surface portion is inversely proportional to the square radius of the sphere.

In the case of known, isotropic irradiation it is consequently possible on the basis of the illumination of a detector to determine the distance from the detector to the light source. With point illumination of a diffuse scattering object, then the isotropy is approximately ensured within a small observation angle 17. Thus, a distance measuring apparatus can be constructed on the basis of the "inverse square law".

Figure 2:
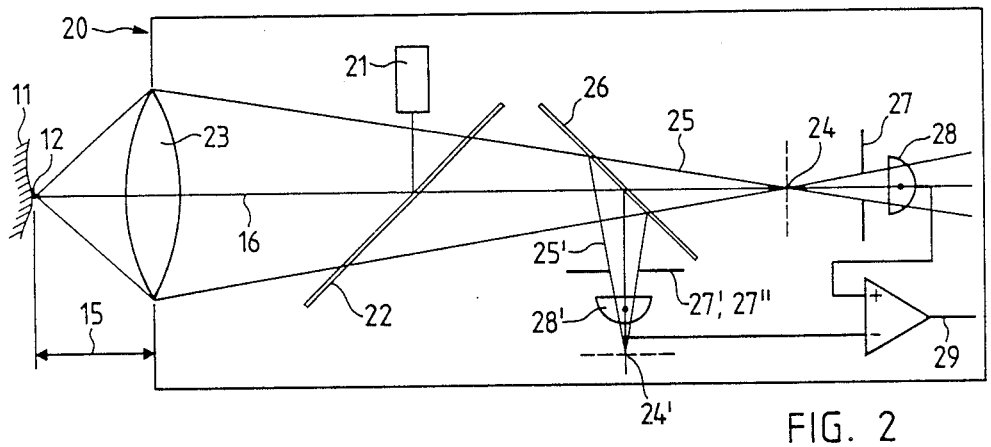
FIG. 2 is a schematic diagram of a first known measuring apparatus based on the "inverse square law"

FIG. 2 shows a known structural embodiment using a technique based on the "inverse square law". Brief reference will firstly be made to U.S. Pat. No. 3,719,421 in which initially the object 11 is illuminated in punctiform manner by means of optics comprising a semireflecting mirror 22 and a lens or objective 23 so that the light spot is imaged with the same objective 23 on the image point 24. The radiation emanating from the light spot is subdivided by the beam-splitting mirror 26 into two partial beams 25,25' and in a first construction those beams are directed onto two pinhole diaphragms 27,27'. One of these diaphragms 27' is located in front of and the other 27 behind the image points 24,24'. The radiant fluxes passing through the diaphragms 27,27' are measured by means of two light detectors 28,28' and the difference 29 of the corresponding electrical signals is formed. When the openings in diaphragms 27,27' are identical in size and oppositely identical spacings of the diaphragms from points 24,24' are maintained, then the light fluxes are identical and therefore the signal difference 29 disappears. If the distance 15 of object 11 from measuring apparatus 20 differs, then there is also a displacement of the position of the corresponding image points 24,24'. There is a change i their spacings from diaphragms 27,27' and also in the light quantities reaching detectors 28,28'. This leads to a change in the difference signal 29, which was originally zero. Within a small range, the difference signal 29 is linearly dependent on the object-objective spacing 25, namely if the distance between the image points 24,24' and the diaphragms 27,27' are approximately oppositely identical. However, if one of the image points 24,24' approaches one of the diaphragms 27,27', then the difference 29 approaches a maximum and then decreases again.

Thus, although the method described in U.S. Pat. No. 3,719,421 is suitable for precisely detecting the distance between an object and a measuring apparatus within a limited, given range, it cannot be used in a general for distance measurement purposes. In fact, outside that narrow range, it is even ambiguous to associate the difference signal with the object-measuring apparatus spacing.

The radiation intensity of light scattered by the scattering light point 12 on the object surface 11 is highly dependent on the light point characteristics. Therefore, the signal difference 29 is dependent on the object. Thus, on the basis of the quantity 29 it is possible to obtain information within a limited distance range 15 as to the direction in which the actual position differs from the desired value, but it is not possible to establish the effective magnitude of the horizontal displacement. Thus, this method does not make it possible to produce a measuring apparatus which generates an output signal from which the actual distance to the object can be determined.

The described distance measuring method is based on an intensity measurement of the light reflected back by the object 11. A necessary criterion for the reliability of this method is the existence of diffuse back-reflection. Thus, if in addition to the diffuse scattering, reflection takes place, then the signal difference 29 is greatly dependent on the inclination of the surface of object 11 at light point 12 with respect to the optical axis 16 of measuring apparatus 20. By replacing one of the two diaphragms 27 by a mirror with a central shield 27'' (a further embodiment of the invention), the measuring errors can be lowered when there is non-diffuse back-reflection the case the object is inclined.

Figure 3:
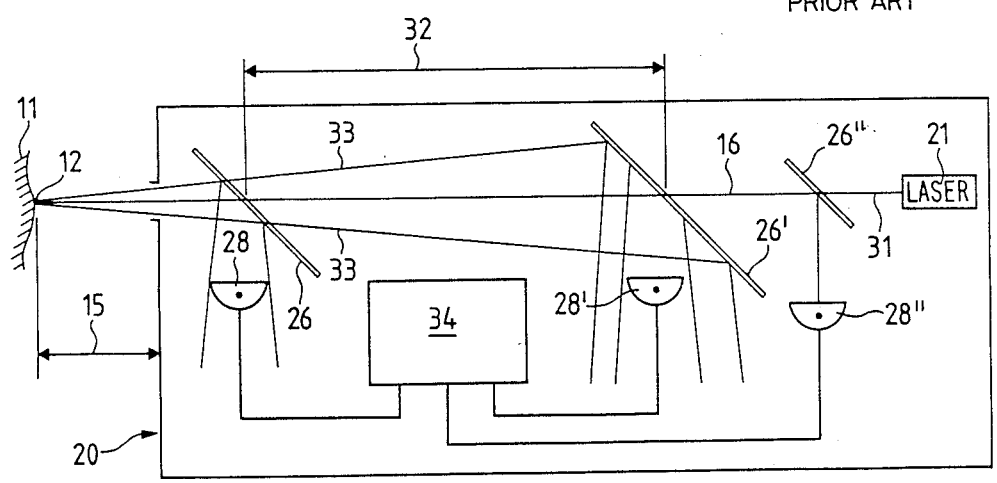
FIG. 3 is a schematic diagram of a second known measuring apparatus based on the "inverse square law"

FIG. 3 shows a further known method, in which the distance measurement is based on the "inverse square law". This method is described in West German patent No. 27 43 063 of E. H. Mehnert, of which two embodiments have already been described. According to a third embodiment, the light source 21 in the form of a laser light transmitter is arranged in the optical axis 16 of measuring apparatus 20, which is once again possible by means of beam splitting mirrors 26, 25',26''. As the laser light source 21 emits a narrow light bundle 31, a punctiform light spot 12 is formed on the object and thus defines the optical axis 16 of the measuring apparatus. Two light receivers 28,28' are also located in this optical axis 16, but are arranged at different distances along the light beam 33 emanating from the light spot. This is possible through the insertion of two beam-splitting mirrors 26,26'. The laser power is controlled by coupling out a third partial beam 26'' and by means of an additional light detector 28'''.

The relationship between the measured illuminations of the light detectors 28,28' and the distance 15 is quadratically dependent on the detector signals and not linear due to the "inverse square law". Digital signal processing means 34 ensures an easy resolution of the corresponding equation system. However, unlike the linear behavior between the measured quantity and the distance 15, the measuring error is not constant and instead is linearly dependent on the divergence from the desired value, which is a serious disadvantage in a range finder or distance measuring apparatus.

Figure 4:
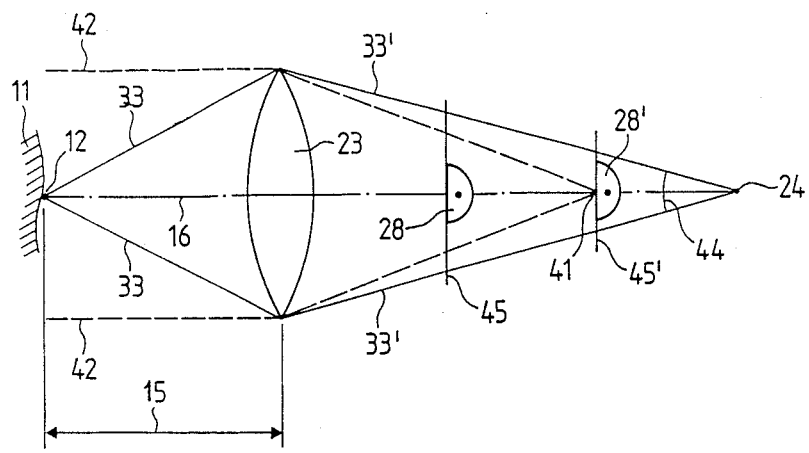
FIG. 4 is a schematic representation of the inventive apparatus.

FIG. 4 shows the principle of a distance measuring method according to the invention. This distance measuring method is based on the "inverse square law". The basis is the measurement of the light intensity of a diffuse light-scattering light spot 12 on the surface of the object 11. The light spot 12 is produced by arranging a laser light source 21 (not shown in FIG. 4) in the optical axis 16.

The diffuse radiation 33 from the illuminated light spot 12 is focussed into a convergent beam 33' by focusing means such as an objective 23. There are two light detectors 28,28' in the convergent beam. One light detector 28 is located in the expanded beam, while the other detector 28' is located at the focal point 41 of the optics, i.e. at the point where a parallel light bundle 42 would focus. It is assumed that the light intensity distribution in the collimated beam 33' is homogenous. On the basis of this assumption the convergence angle 44 of beam 33' can be determined from the measured light intensity and, as a result of the lens equation, the sought object distance 45 is obtained.

Figure 5:
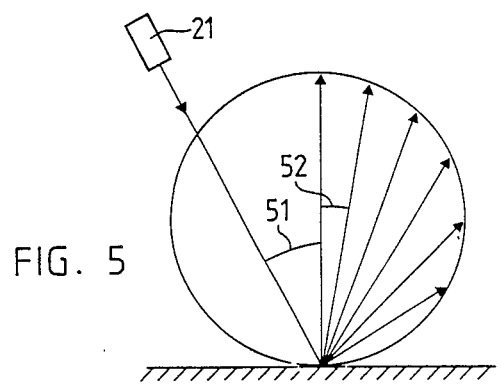
FIG. 5 is a diagram illustrating Lambert's law of diffuse light scattering.

Thus, the most important prerequisite for the operation of the method is the presence of very structureless, uniformly diffused light scattering at or from object 11. In the ideal case of Lambertian back-reflection, the homogeneity of the radiation over a wide angular range is ensured, as shown in FIG. 5. The light beam, e.g., of a laser light source 21 enters at an angle 51 and is observed at the variable angle 52. According to Lambert's law, the radiation magnitude measured at any of the observation angles 52 is given by a constant value divided by the cosine of this angle 52.

Figure 6:
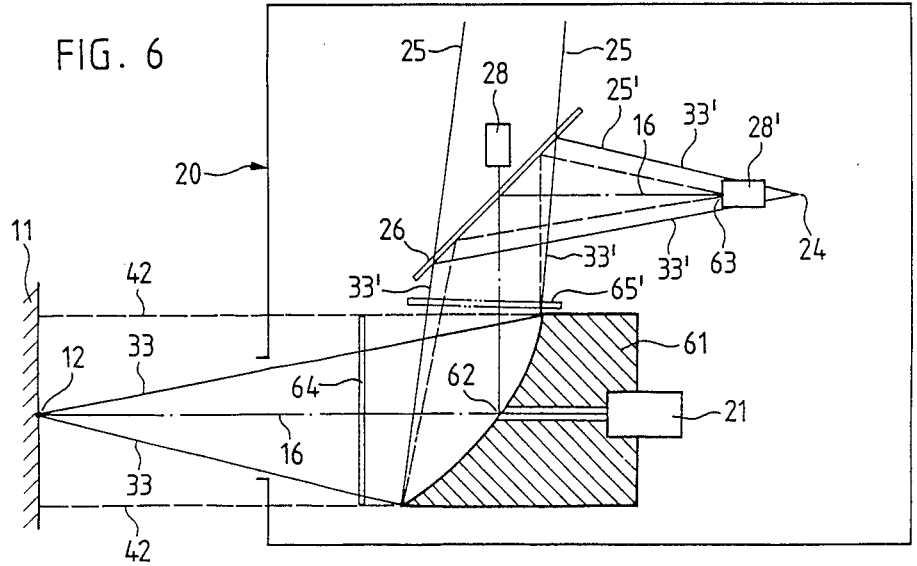
FIG. 6 is a schematic diagram of a first embodiment of an apparatus constructed according to the inventive method.

FIG. 6 shows an embodiment of a method using the principle of FIG. 5. A further difference mirror is introduced for bringing about the axial arrangement of the laser light source and the detectors.

A light spot 12 is produced by the light source, particularly a laser light source 62, on the object 11 after passing through a passage in concave cylindrical mirror 61, and the spot emits diffuse radiation. Part of this, represented by beam bundle 33, passes into the distance measuring device 20 and is focussed into a beam 33' by the concave cylindrical mirror 61. However, focusing does not take place by means of an objective such as lens 23 in two dimensions, but only one-dimensionally by mirror 61 which is cylindrical parabolic mirror. The laser light source 62, as well as two light detectors 28,28' are located in the same optical axis 16 the direction which is changed by a beam-splitting mirror 26. One of the detectors 28' is located in the focal line 16 of the cylindrical parabolic mirror, the focal line being defined as the geometrical locus 16 of all the points on which a parallel light beam 42 entering the apparatus is imaged. Detectors 28,28' are dimensioned in such a way that in one dimension they can detect the full, unfocused light beam entering the apparatus.

Figure 7A:
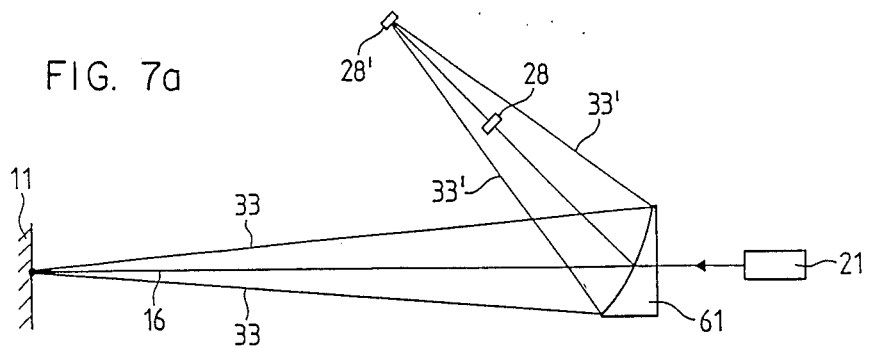
FIG. 7 is a diagram of the optical path of the apparatus of FIG. 6 with a cylindrical concave mirror in plan view and side elevation.
Figure 7B:
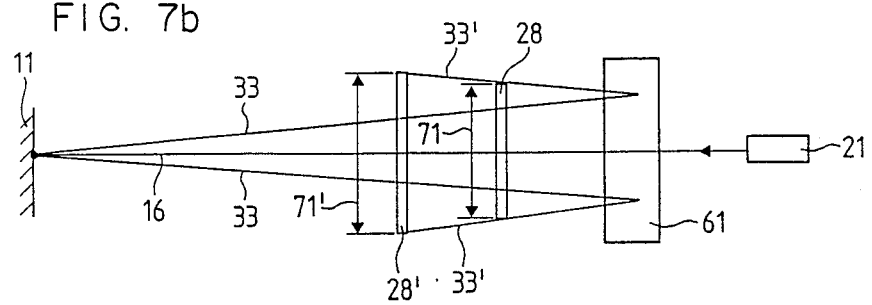

FIGS. 7a and 7b show the concave cylindrical parabolic mirror 61 and the corresponding optical path before (at 33) and after (at 33') the reflection on mirror 61 in side elevation and plan view, to respectively. To facilitate illustration, a reflection angle differing from 90° has been chosen.

The method leads to a linear dependence of the distance to be measured on the quotient of the measured detector signals. The functional link between the voltage signals $E_{28'}$ or $E_{28}$ produced by detectors 28' and 28 and the distance from light spot 12 on object 11 is given by the following relationship:

$$\text{Distance} = (E_{28'}/E_{28}) * C_1 - C_2$$

in which the two constants $C_1$ and $C_2$ are apparatus-specific and exclusively dependent on the distances between light spot 12 and detectors 28,28' measured along the optical axis.

If the signal on light detector 28 is kept at a fixed, predetermined value, which is possible by regulating the output of laser light source 21, there is a further simplification to the distance formula, no signal division being necessary.

Figure 8A:
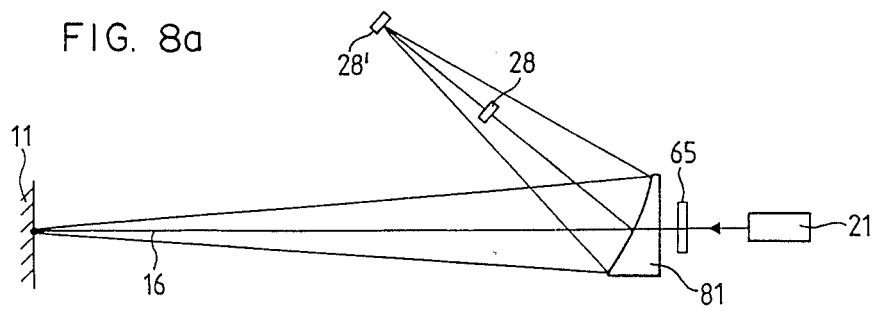
FIG. 8 is a diagram of the corresponding representation of an embodiment with a bifocal mirror.
Figure 8B:
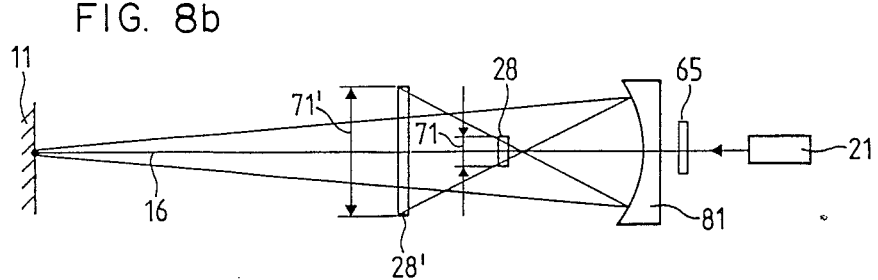

Another embodiment of the inventive method is shown in FIG. 8. The aforementioned cylindrical parabolic mirror 61 is replaced by a bifocal parabolic mirror 81.

As shown in FIG. 7, a cylindrical parabolic mirror 61 would require very wide light detectors 28,28'. To limit the width 33' of the reflected beam and therefore also for reducing the width 71,71' of the light detectors 18,18', it has proved advantageous to use bifocal focussing means in the form of a bifocal parabolic mirror 81. The focal length with respect to the plane of symmetry is adapted to the geometrical circumstances. In the vertical direction to said plane of symmetry, half the focal length of the former was chosen. As a result the beam in the vertical direction to the plane of symmetry if focussed approximately at half the distance between mirror 81 and the focal line 63 (at right angles to the plane of symmetry) of concave mirror 81 known from FIG. 6. Thus, more favorable dimensions are obtained for the widths 71,71' of light detectors 28,28'.

FIG. 8 illustrates the construction of the distance measuring apparatus with a bifocal parabolic mirror 81. For a prototype a reflection angle of 90° was chosen. The focal lengths of the bifocal parabolic mirror are 5 and 2.5 cm.

No problems are encountered with the aforementioned distance measuring methods based on the "inverse square law" provided that the light spot 12 on target 10 is an isotropic radiator, i.e. the irradiated light power in each solid angle element is the same. This roughly applies in the case of an active-emitting light. This condition is also largely fulfilled in the case of indirect illumination if the object brings about an ideal diffuse scattering of the incident light and the normal to the surface at the light spot 12 coincides with the optical axis 16 of the measuring apparatus 20. Divergences from the ideal Lambertian scattering (FIG. 5), such as light reflections, lead to local intensity fluctuations in planes 45,45' of light detectors 28,28' and therefore to errors in the distance measurement.

Figure 9:
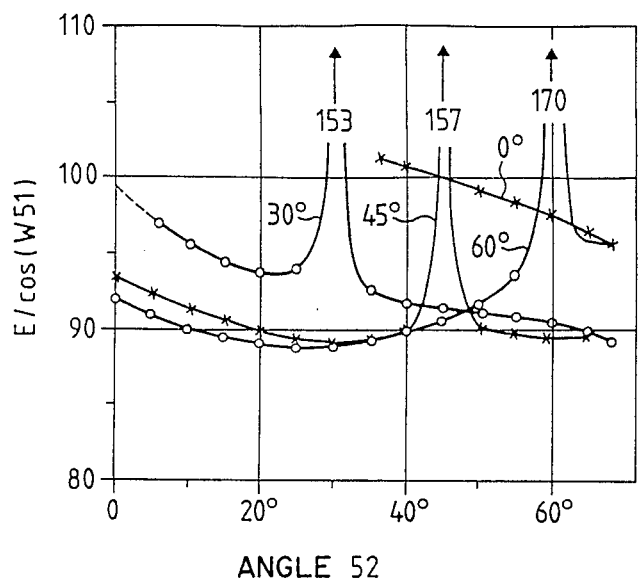
FIG. 9 is a graph of the intensity distribution as a function of the observation angle of a point-illuminated, partly reflecting surface.

FIG. 9 shows the Bragg angle effect, i.e., a significant divergence from Lambert's law. The irradiation of a light spot, divided by the cosine of the light incidence angle 51, is plotted for four different incidence angles 51 of 0°, 30°, 45° and 60° as a function of the observation angle 52. The sample is partly reflecting, compressed $BaSO_4$. It is clear that for the different incidence angles the marked reflection can be differentiated from the diffuse component. It is clear that such reflections, even if the light incidence angle 51 does not correspond to the observation angle 52, can lead to significant inaccuracy in the intensity measurement and therefore to misinterpretations of the object distance. Therefore ways must be sought to remove this disturbing effect from pure diffuse scattering.

As can be gathered from U.S. Pat. No. 3,719,421 of J. L. Poilleux and J. Tourret, this problem was recognized. Corresponding counter measures are described therein, which are based on a modification of the geometry of the optical path, i.e. the replacement of diaphragms 27' by a shield 27" in the center of beam 25'.

Another method for removing the inaccuracies in the distance measurement is based on using the polarizing characteristics of the radiation emitted by the light source 12, cf. German patent application No. P 37 43 194.3.

It is assumed that during reflection, the polarization of the incident beam is retained, whereas the diffuse scattering is substantially unpolarized. However, there is not complete depolarization with diffuse scattering of either parallel light, or light polarized at right angles to the incident plane (G. Kortum "Reflexionspektroskopie", Springer Verlag 1969, p.38), but this effect is generally very small.

Efficient decoupling of the reflected radiation component can be achieved by means of an optical insolation 64 (FIG. 6) comprising a linear and circular polarizer. This measure leads firstly to the circular polarization of the primary beam in one direction and the component of the radiation circularly polarized in the opposite direction is measured.

Figure 14:
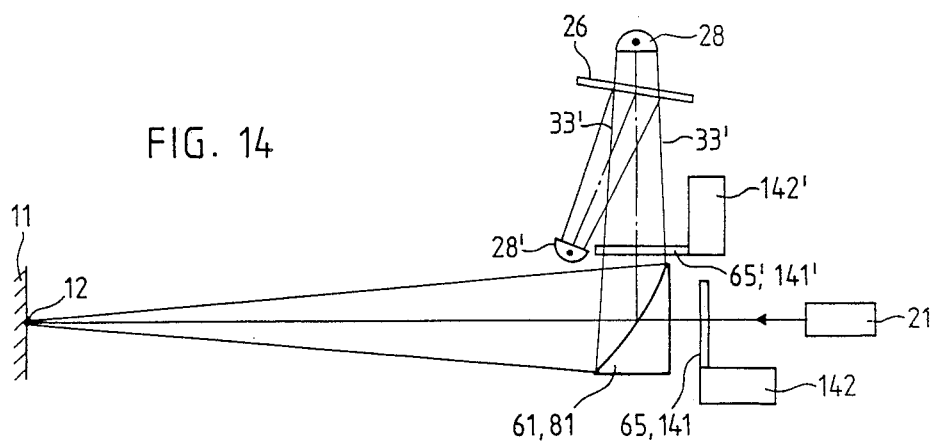
FIG. 14 is a schematic diagram of a fourth embodiment of the inventive apparatus, in which the polarizers or quarter-wave plates are moved.

If the light source already emits polarized light, which partly applies in the case of laser light sources 21, the separation of the undesired reflected beam from the desired diffuse scattered beam can be more easily carried out by inserting a polarizer 65' after concave mirror 61,81 (as shown in FIG. 14). Preferably, the polarization directions of the laser light source 21 and the polarization 65' are at right angles to one another. It is also advantageous to turn the polarizing direction of the laser with respect to the plane of symmetry of the concave mirror by 45°. For the selected perpendicular arrangement of the two polarizing directions, it follows that the polarizing direction of the beam striking the beam splitter 26 is turned by −45° with respect to the reflection plane of the beam splitter. Thus, the dependence of the beam splitting conditions on the intensity of the polarization or the depolarization of the incident beam 33' disappears, as can be concluded from FIG. 10.

In connection with the explanation of FIG. 6, it was stated that it is advantageous for the evaluation to keep the signal on light detector 28 at a fixed, predetermined value, which is possible by regulating the laser light source 21. This measure naturally means that the source 21 must be operated at very different power levels as a function of the order of magnitude of distance 15 and the characteristics of the object surface 11 which leads to the problems described hereinafter.

The degree of polarization of polarized operated semiconductor lasers is power-dependent. Thus, the emitted beam of a typical GaAs laser operating at 780 nm is 95% polarized at full power, but the degree of polarization can drop to 70% under reduced power. This means that at a lower laser power, i.e. with a large object distance 15 or strong absorption of the object surface 11, the reflected radiation component is no longer efficiently separated from the diffuse scattered radiation component. This problem can be eliminated by replacing the polarized laser 21 by an unpolarized laser light source with a polarizer 65 (FIG. 8).

If a semiconductor laser is electrically loaded, not only is there a change to its optical output power but, due to the temperature dependence of the energy band gap, its emission wavelength can also easily change. Due to a weak wavelength dependence of the transmission or reflecting power of the beam splitter 26, the splitting of the incident beam 33 into the partial beams 25,25' is dependent on the power of the laser light source 21. In the present measuring method, this change to the intensity conditions is interpreted as a distance change of the object with respect to the measuring apparatus. Account can largely be taken of this measuring error by a careful choice of beam splitter 26.

Figure 10:
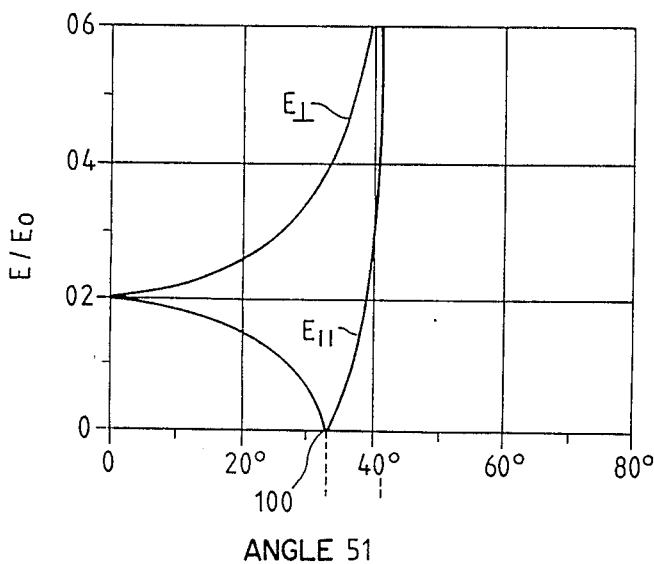
FIG. 10 is a graph of the light reflection on a mirror as a function of the angle of inclination for parallel light and light polarized at right angles to the reflecting surface.
Figure 11:
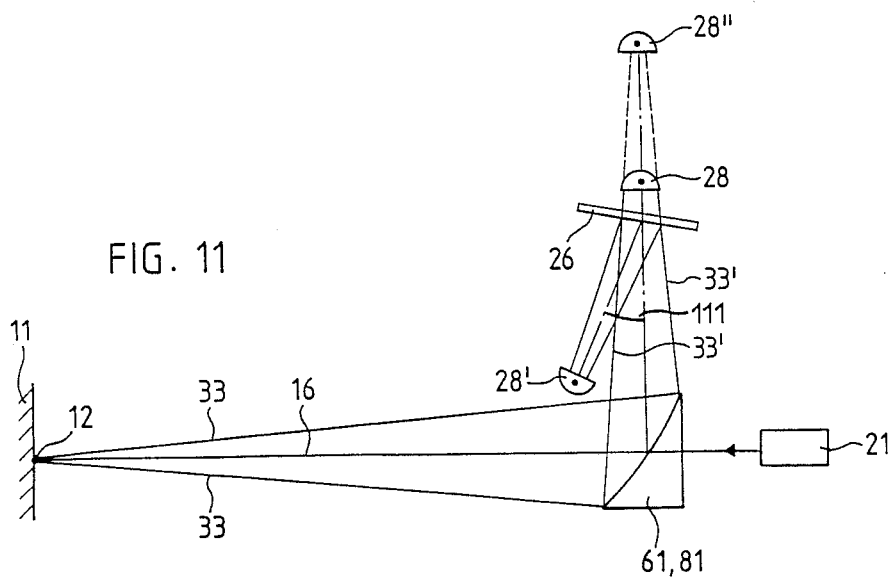
FIG. 11 is a schematic diagram of a second embodiment of the inventive apparatus, in which the polarization property of the beam-splitting mirror is largely eliminated.

The power-caused change to the degree of polarization of the semi-conductor laser can lead to a distance measuring error when reflection occurs in the light spot 12 in a further way. The parallel polarized components and the components polarized at right angles to the light incidence plane of the incident light beam are not reflected by the same amount by the beam splitter, as is shown in FIG. 10. In particular, the reflection of the beam polarized parallel to the light incidence plane at the so-called Brewster angle 100 disappears, while the vertical component constantly increases with an increase in the light incidence angle. However, this error source can easily be eliminated because the reflection-caused polarization effect only appears to a limited extent for small incidence angles, as shown in FIG. 10. Therefore, it is apparent that one can (unlike in FIG. 6) mount the beam splitter 20 at an angle smaller than 45°. According to FIG. 10, it is advantageous to have an angle between the surface normal to beam splitter 26 and the optical axis of beam 33 of less than 20°, as shown in FIG. 11.

Figure 12:
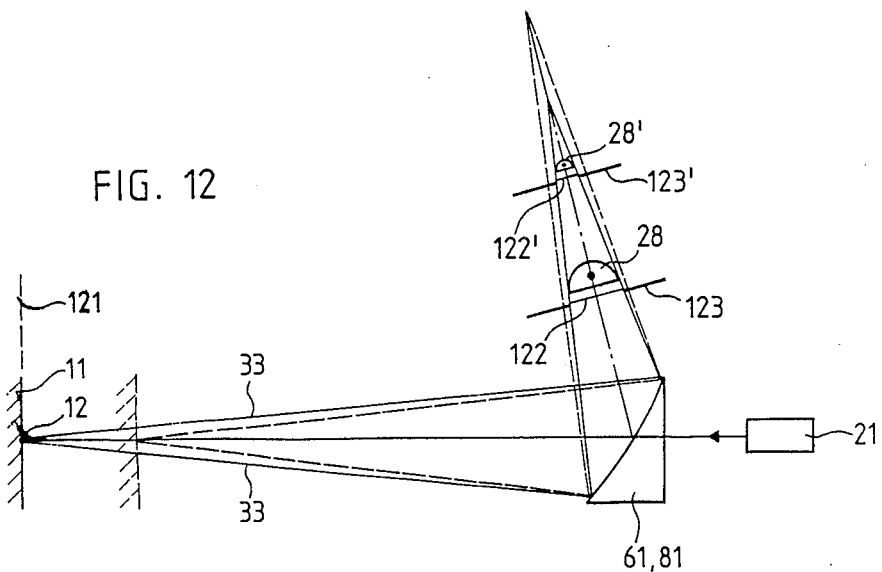
FIG. 12 is a schematic diagram of a third embodiment illustrating the principle of the neutral plane measuring method.

Often, e.g. in robotics, it is of great interest for the distance measurement within a given range to be very accurate. For this case the embodiment of the distance measuring method with a so-called neutral plane 121 (FIG. 12) is very appropriate. For a desired distance value, it is a question of fixing the two detector surfaces and the position of the light detectors 28,28' in such a way that the boundary of the convergent measurement beam straddled by the concave mirror 61,81 precisely coincides with the edge of the light-sensitive layer of the detectors 28,28'. In FIG. 12, the beam splitter 26 has been omitted to facilitate understanding. When the measuring surface 11 is positioned in neutral plane 121 the light-sensitive layers of both light detectors 28,28' are irradiated by light spot 12 under precisely the same solid angle, not only as regards magnitude, but also as regards shape.

Distance measurements in the vicinity of the neutral plane 121 are completely independent of the homogeneity of .he illumination of the detector surface, because the detectors detect the radiant flux consequently radiation inhomogeneities can have no effect.

Instead of precisely adapting the surface and shape of the light detectors 28,28' to the optical path 33,33' for neutral plane 121, it is advantageous to use identical detectors and to limit their active surfaces 122,122' by means of diaphragms 123,123' to the given value. The use of identical detectors is advantageous for ensuring the same sensitivity, temperature dependence and aging.

It is pointed out that the light-sensitive layers of light detectors 28,28' or diaphragms 123,123' do not have to be dimensioned in such a way that they affect all the radiation 33' reflected by concave mirror 61,81. They can also be dimensioned so that only part of beam 33' is received by the light detectors 28,28'. All that is important is that both light detectors see the light spot 12 under precisely the same solid angle if the object 11 is located in the neutral plane.

Due to the high light intensity and good beam bundling, a laser light source 21 is most suitable for producing the light spot 12 on object 11. However, the high chromatic radiation of these sources leads to disadvantages. The small band width of the laser also means a large coherence length. This is typically 0.1 to 0.5 mm for semiconductor lasers. This large coherence length means that the reflected and scattered beams can interfere over a larger area of the light spot. The consequence of this is laser light-typical intensity fluctuations, which appear as a "granular" structure of the illuminated surface with so-called speckles. The latter are imaged by the concave mirror 61,81 on the light-sensitive areas 122,122' of light detectors 28,28'. On limiting the beam by the border of the detectors or by the diaphragms, intensity fluctuations then occur, which manifest themselves as reduction of the measuring accuracy. As a counter measure with respect to the speckles, it is advantageous to use light sources with a small coherence length, i.e. large band width. For example, it is advantageous to use a multimode laser in place of a monomode laser.

Figure 13:
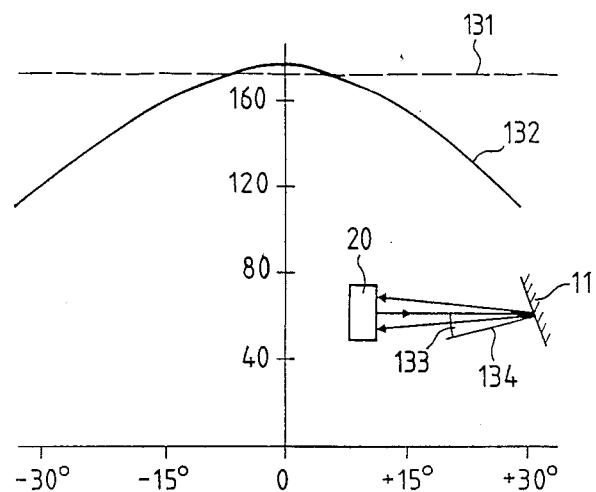
FIG. 13 is a diagram illustrating a distance measurement of a strongly polarizing surface as a function of the inclination angle thereof.

The gloss effect of the object surfaces, as shown in FIG. 9, can lead to considerable distance imprecisions, as is apparent from FIG. 13. For white, almost purely diffuse scattering paper 131, very high accuracy is obtained for the distance measurement as a function of the inclination angle 133 of the optical axis 16 with respect to the surface normal 134. However, as a function of the inclination angle 134, very considerable dependence has been found with the same measuring arrangement in the case of low luster paper 132.

As the reflection is highly polarization-dependent, as illustrated in FIG. 10, it is appropriate to adapt the polarizing direction of laser light source 21 to the inclination of the object surface. For example, this can be achieved by minimizing the reflection part of the reflected-back radiation 33. This objective can be achieved by rotating the polarizer characteristics, i.e. reflects the instant light in partly non-diffuse manner. If the polarization direction variation disappears, no polarized radiation is present and consequently the distance measurement is reliable. If the signal does not appear, an indication can e.g., be given, or more favorable value for the position of the polarizing direction can be sought.

It is pointed out that, apart from the polarization plane of the laser light source 21, that of the reflected beam 33' must also be rotated, so that the two polarizing directions are substantially at right angles to one another. The former rotation can e.g. be brought about by rotating the laser light source 21, by rotating a quarter-wave plate 141', a polarizer 65', or magnetically by means of the Faraday effect. However, as it is very small, the Faraday effect is problematical, unless use is made of a long Faraday cell or a very high magnetic field. For rotating the polarization of beam 33', it is possible to rotate polarizer 65, or optionally an addition quarter-wave plate 141. The drive for the quarter-wave plate 141,141', or polarizers 65,65' can e.g. take place by means of motors 142,442'.

Instead of subjecting the quarter-wave plates 141,141' or polarizers 65,65' to a continuous movement, they can also be vibrated. The disappearance of an alternating signal component on light detectors 28,28' means that there is purely diffuse light scattering and therefore the distance measurement is reliable.

What is claimed is:

1. A method for optically measuring the distance between a measuring apparatus and an object comprising the steps of transmitting a highly collimated light beam from the measuring apparatus to a target area on the object, one-dimensionally focussing light reflected from the target area into a light beam with an optical system in the measuring apparatus having a focal plane, splitting the beam upstream of the focal plane into two partial beams with a beam splitter, and measuring the radiation intensities of the two partial beams with two light detectors positioned in the common optical axis but at different distances from the beam splitter, and producing electrical signals proportional to the measured intensities, one of the intensity measurements being performed at one of the focal planes which is defined as the plane normal to the optical axis at the focus or in the focal line of the reflected-back beam, the light detection taking place along one dimension and at least to the same extent as the light beam entering the measuring apparatus, evaluating the electrical signals as a measure of the distance to be measured.

2. A method according to claim 1 and including regulating the intensity of the light source as a function of the distance between the measuring apparatus and the object and as a function of the surface characteristics of the measuring face of the object such that the output signal from one of the two light detectors is constant.

3. A method according to claim 2 wherein one light detector is closer to the beam splitter than the other and including regulating the light intensity of the light source to maintain the output of the closer light detector at a constant value.

4. A method according to claim 3 and including polarizing the light beam striking the object to supress direct reflections and eliminating the polarization state obtained from direct reflection during the detection of the two partial beams.

5. A method according to claim 4 wherein the reflected back light beam is one-dimensionally reflected by a concave mirror and including polarizing the light beam striking the object at an angle of 45° relative to the plane of symmetry of the concave mirror.

6. A method according to claim 5 wherein the light source emits polarized light.

7. A method according to claim 3 and including providing an optical isolator comprising a linear and a circular polarizer in the common optical path of the emitted collimated beam and the instant light bundle.

8. A method according to claim 7 and including maintaining the angle between the optical axis of the light beam and the incident on the beam splitter and a line normal to the surface of the beam splitter to less than 20° to prevent depolarization of the partial beams produced by the beam splitter.

9. A method according to claim 8, and including, when the measuring face is located in the neutral plane and is located a predetermined distance from the measuring apparatus, focussing the beam with a concave mirror so that the edge of the beam precisely coincides with the edge of the light-sensitive surface of the light detector positioned furthest from the mirror.

10. A method according to claim 1 including dimensioning the light detectors so that they see the light spot on the target object with exactly the same solid angle as to magnitude and shape when the measuring face is located in the neutral plane and is located a predetermined distance from the measuring apparatus by using a concave mirror to focus the edge of the reflected beam so that it precisely coincides with the edge of the light-sensitive surface of the light detectors.

11. A method according to claim 1 including positioning diaphragms partly covering the light-sensitive surfaces of the light detectors so that the detectors see the reflected light spot with precisely the same solid angle as to magnitude and shape when the measuring face is located in the so-called neutral plane and is located a predetermined distance from the measuring apparatus and so that the edge of each beam focussed by the concave mirror precisely coincides with the edge of the diaphragm.

12. A method according to claim 1 and including rotating the polarization planes of the light beam leaving the measuring apparatus and the light beam reflected by the focussing means to reduce the beam component reflected directly by the target.

13. A method according to claim 1 and including vibrating the polarization planes of the light beam leaving the measuring apparatus and the light beam reflected by the focussing means to determine the dependence of the detector signals on the polarization positions of the polarizers.

14. A method for optically measuring the distance between a measuring apparatus and an object comprising the steps of transmitting a highly collimated light beam from the measuring apparatus to a target area on the object, bifocally focussing light reflected from the target area into a light beam with an optical system in the measuring apparatus having a focal plane, splitting the beam upstream of the focal plane into two partial beams with a beam splitter, and measuring the radiation intensities of the two partial beams with two light detectors positioned in the common optical axis but at different distances from the beam splitter and producing electrical signals proportional to the measured intensities, one of the intensity measurements being performed at one of the focal planes which is defined as the plane normal to the optical axis at the focus or in the focal line of the reflected-back beam, the light detection taking place along one dimension and at least to the same extent as the light beam entering the measuring apparatus.

15. An optical distance measuring apparatus comprising a light source capable of projecting a highly collimated light beam from the measuring apparatus onto an object;

an optical system for focussing light reflected from the measuring face of the object, said optical system including concave mirror means for one-dimensionally focussing and reflecting the light reflected by the target surface into the measuring apparatus;

a beam splitter positioned upstream of the focal plane of the optical system for splitting the focussed beam into two partial beams; and first and second light detectors for measuring the radiation intensities of said partial beams and for producing output signals representative of the intensities of radiation incident thereon, said light detectors being positioned in the common optical axis but at different distances from said beam splitter;

at least one of said detectors being positioned in at least one of the focal planes of the focussing optical system, said at least one focal plane being defined as the plane normal to the optical axis in the focus in the focal lines of the optical system, and wherein said detectors having in one dimension at least as large a light beam receiving surface as the light beam entering the measuring apparatus and reflected by the optical system; and evaluation means for forming the quotient of the signals produced by said detectors.

16. An apparatus according to claim 15 wherein said concave mirror is parabolic.

17. An apparatus according to claim 15 wherein said concave mirror is cylindrical.

18. An apparatus according to claim 15 wherein said concave mirror is a bifocal mirror.

19. An apparatus according to claim 15 and including polarizing means downstream of said concave mirror in the light beam incident on the object and the light beam reflected from the object.

20. An apparatus according to claim 19 wherein said polarizing means is arranged so that the light beam incident on the object is polarized at an angle of 45° relative to the plane of symmetry of said concave mirror.

21. An apparatus according to claim 20 wherein said polarizing means is a polarizer.

22. An apparatus according to claim 21 wherein said polarizer is rotatable.

23. An apparatus according to claim 20 wherein said beam is polarized and said polarizing means includes a quarter wave plate located in said polarized beam.

24. An apparatus according to claim 23 wherein said quarter wave plate is rotatable.

25. An apparatus according to claim 23 wherein the light source of said measuring apparatus includes a polarizer.

26. An apparatus according to claim 15 and including an optical isolator comprising a linear polarizer and a circular polarizer upstream of said concave mirror.

27. An apparatus according to claim 15 wherein said beam splitter is positioned at about a right angle to the optical axis of the focussed light beam.

28. An apparatus according to claim 15 wherein light sensitive surfaces of said light detectors are dimensioned so that when the face of the measured object is a predetermined distance from the measuring apparatus in a neutral plane, the edge of the beam focussed by said concave mirror precisely coincides with the edges of said light sensitive surfaces and said detectors receive images of the light spot on said surfaces with exactly the same solid angle as to magnitude and shape.

29. An apparatus according to claim 15 and further including diaphragms associated with said light detectors positioned so that when the face of the measured object is a predetermined distance from the measuring apparatus in a neutral plane, the edge of the beam focussed by said concave mirror precisely coincides with the edges of said light sensitive surfaces and said detectors receive images of the light spot on said surfaces with exactly the same solid angle as to magnitude and shape.

30. An apparatus according to claim 15 wherein said light source is a laser source.

31. An apparatus according to claim 15 for measuring distances in the range of from about 0 cm to about 30 cm.

* * * * *